United States Patent Office 3,024,192
Patented Mar. 6, 1962

3,024,192
PROCESS FOR THE CONTROL OF BACTERIA IN A FLOODING PROCESS FOR THE RECOVERY OF PETROLEUM OIL
Edward O. Bennett, Houston, Tex., and Edward B. Hodge, Terre Haute, Ind., assignors to Commercial Solvents Corporation, New York County, N.Y., a corporation of Maryland
No Drawing. Filed Nov. 13, 1959, Ser. No. 852,614
9 Claims. (Cl. 252—8.55)

Our invention relates to the control of bacteria in water flooding operations used in the secondary recovery of petroleum oils, and more particularly, to controlling such organisms by incorporating into the flooding water effective amounts of halonitroalkanols.

U.S. Patent No. 2,839,467 lists many of the problems found in the secondary oil recovery art and the means whereby some of these problems have been solved. The problem of controlling sulfate reducing bacteria such as *Desulfovibrio desulfuricans* is ever present and always difficult, as the growth of the microorganisms is not controlled by economically practicable amounts of many bactericides generally utilized in bacterial control and the microorganisms sometimes become resistant to generally used bactericides.

The problems attending the control of other microorganisms are more easily solved but are, nevertheless, present These microorganisms are generally controlled by moderate amounts of known bactericides.

We have now discovered that noxious microorganisms are economically controlled by halonitroalkanols. The halonitroalkanols which we employ have the following structural formula:

where R and R¹ are selected from the group consisting of hydrogen, methyl, ethyl, propyl, hydroxymethyl, hydroxyethyl, hydroxypropyl, hydroxybutyl and hydroxypentyl, with the proviso that R and R¹ together must contain at least one hydroxyl group; and the further proviso that if both R and R¹ contain hydroxyl groups, then R and R¹ must be identical; and where X is selected from the group consisting of chloro and bromo; and mixtures thereof.

Examples of compounds which we employ in our process include: 2-chloro-2-nitro-1-butanol, 1-chloro-1-nitro-2-pentanol, 2-bromo-2-nitro-1,3-propanediol, 1-chloro-1-nitro-2-hexanol, 2-chloro-2-nitro-1,3-propanediol, 1-chloro-1-nitro-3-methyl-2-butanol, 2-chloro-2-nitro-1-propanol, 4-chloro-2,6-dimethyl-4-nitro-3,5-heptanediole, etc.

The halonitroalkanols of our process may be prepared by the condensation of nitroparaffins with aldehydes in the presence of a molar amount of base equal to the molar amount of the nitroparaffin; followed by the halogenation of the resulting solution.

The usual procedure for treatment of water to be utilized in flooding operations is to produce a concentrate of the bactericide in water and then continuously inject this concentrate into the water to be used in flooding operations at a rate which forms a desired dilution of the bactericide. This is done prior to pumping the water into the oil bearing subterranean formation.

Sampling and checking of the water for sulfate reducing bacteria will show whether the chemical concentration needs to be raised or maybe lowered to control effectively the bacteria count of the flooding water.

Alternatively, the bactericides utilized in our process may be added to the oil bearing formations periodically, for example, once a week, as a high potency concentrate or the undiluted bactericide may be injected into the formation.

We have found that the compounds utilized in our process are active against some strains of bacteria in water at concentrations as low as about 1–5 p.p.m. However, we prefer to utilize concentrations of at least about 5 p.p.m. as we have found that even resistant strains of *Desulfovibrio desulfuricans* are effectively controlled at these concentrations.

It is to be understood, of course, that not all of the compounds used in our process are effective to the same degree. The following table sets out concentrations at which we have found representative halonitroalkanols to be completely effective against a resistant strain of *Desulfovibrio desulfuricans* in water flooding operations.

| Halonitroalkanol: | Effective concentration (p.p.m.) |
|---|---|
| 2-chloro-2-nitro-1-butanol | 5–10 |
| 1-chloro-1-nitro-2-pentanol | 1–2.5 |
| 2-bromo-2-nitro-1,3-propanediol | 5–10 |
| 2-chloro-2-nitro-1,3-propanediol | 5–10 |
| 1-chloro-1-nitro-2-hexanol | 5 or less |
| 1-chloro-1-nitro-3-methyl-2-butanol | 5 or less |
| 2-chloro-2-nitro-1-propanol | 15 |
| 4-chloro-2,6-dimethyl-4-nitro-3,5-heptanediol | 5 |

The following example sets out the procedure used in testing our halonitroalkanols for the control of sulfate reducing microorganisms. It is not intended that our invention be limited to the exact compositions or concentrations shown. Rather, it is intended that all equivalents obvious to those skilled in the art be included within the scope of our invention as claimed.

*Example*

In a water treatment plant, a water concentrate containing 1-chloro-1-nitro-2-pentanol is continually added to water to be pumped into a subterranean oil bearing formation at such a rate that a 2.5 p.p.m. solution of the halonitroalkanol is formed. The halonitroalkanol treated flooding water is pumped into the oil bearing formation and is completely effective in preventing bacterial plugging of the oil bearing sands and the piping system utilized in the water flooding operations.

This application is a continuation-in-part of our application Serial No. 812,820, filed May 13, 1959, now abandonded.

Now having described our invention, what we claim is:
1. In a flooding process for the recovery of oil from oil bearing subterranean formations, the improvement which comprises flooding the oil bearing subterranean formation with an aqueous liquid containing at least about 5 p.p.m. of a halonitroalkanol having the following structural formula:

where R and R¹ are selected from the group consisting of hydrogen, methyl, ethyl, propyl, hydroxymethyl, hydroxyethyl, hydroxypropyl, hydroxybutyl, and hydroxypentyl; with the proviso that R and R¹ together must contain at least on hydroxyl group; and the further proviso that if both R and R¹ contain hydroxyl groups, then R and R¹ must be identical; and where X is selected from the group consisting of chloro and bromo; and mixtures thereof.

2. The process of claim 1 wherein the halonitroalkanol is 2-chloro-2-nitro-1-butanol.

3. The process of claim 1 wherein the halonitroalkanol is 1-chloro-1-nitro-2-pentanol.

4. The process of claim 1 wherein the halonitroalkanol is 2-bromo-2-nitro-1,3-propanediol.

5. The process of claim 1 wherein the halonitroalkanol is 1-chloro-1-nitro-2-hexanol.

6. The process of claim 1 wherein the halonitroalkanol is 2-chloro-2-nitro-1,3-propanediol.

7. The process of claim 1 wherein the halonitroalkanol is 1-chloro-1-nitro-3-methyl-2-butanol.

8. The process of claim 1 wherein the halonitroalkanol is 2-chloro-2-nitro-1-propanol.

9. The process of claim 1 wherein the halonitroalkanol is 4-chloro-2,6-dimethyl-4-nitro-3,5-heptanediol.

References Cited in the file of this patent

UNITED STATES PATENTS

| | | |
|---|---|---|
| 1,502,174 | Chapman | July 22, 1924 |
| 2,281,239 | Hass | Apr. 28, 1942 |
| 2,419,021 | Harnden | Apr. 15, 1947 |
| 2,692,231 | Stayner et al. | Oct. 19, 1954 |
| 2,763,962 | Hardy | Sept. 25, 1955 |
| 2,839,467 | Hutchinson et al. | June 17, 1958 |
| 2,882,227 | Lindberg | Apr. 14, 1959 |

FOREIGN PATENTS

| | | |
|---|---|---|
| 421,189 | Italy | Mar. 19, 1947 |